United States Patent [19]
Mohatt et al.

[11] Patent Number: 5,867,303
[45] Date of Patent: Feb. 2, 1999

[54] METHOD AND APPARATUS FOR OPTIMIZING THE OUTPUT OF A HARMONIC GENERATOR

[75] Inventors: Dennis J. Mohatt, Wyoming; Noureddine Melikechi, Dover; Robert S. Tamosaitis, Hockessin, all of Del.

[73] Assignee: Altos Inc., Hockessin, Del.

[21] Appl. No.: 858,714

[22] Filed: May 19, 1997

[51] Int. Cl.[6] .................................................. G02F 1/37
[52] U.S. Cl. ........................ 359/328; 359/332; 385/122
[58] Field of Search ................................... 359/326–332; 385/122; 372/21, 22

[56] References Cited

U.S. PATENT DOCUMENTS

| | | | |
|---|---|---|---|
| 3,949,323 | 4/1976 | Bierlein et al. | 332/7.51 |
| 4,591,291 | 5/1986 | Owens | 404/118 |
| 4,968,121 | 11/1990 | Bruesselbach et al. | 359/328 |
| 5,029,976 | 7/1991 | Goto | 385/122 |
| 5,185,752 | 2/1993 | Welch et al. | 372/22 |
| 5,191,588 | 3/1993 | Dacquay | 372/22 |
| 5,199,097 | 3/1993 | Shinokura et al. | 385/122 |
| 5,237,578 | 8/1993 | Amano | 372/22 |
| 5,243,611 | 9/1993 | Hyuga et al. | 372/22 |
| 5,253,102 | 10/1993 | Okazaki | 359/328 |
| 5,253,259 | 10/1993 | Yamamoto et al. | 372/22 |
| 5,268,912 | 12/1993 | Tatsuno et al. | 372/22 |
| 5,301,059 | 4/1994 | Kitaoka et al. | 359/332 |
| 5,446,750 | 8/1995 | Ohtsuka et al. | 372/22 X |
| 5,513,196 | 4/1996 | Bischel et al. | 372/22 |
| 5,546,220 | 8/1996 | Endo et al. | 359/332 |

*Primary Examiner*—John D. Lee
*Attorney, Agent, or Firm*—Robert J. Reichert

[57] ABSTRACT

A method of optimizing the output of harmonic frequency light from a nonlinear ferroelectric generator optical device by differentially controlled input of external energy to the optical device along its length, with greater energy input near the input end than near the output end of the optical structure, the energy input being controlled to achieve the desired level of output; and devices comprising optical structures and energy input means for practicing this method.

19 Claims, 8 Drawing Sheets

METHOD AND APPARATUS FOR OPTIMIZING THE OUTPUT OF A HARMONIC GENERATOR

FIELD OF THE INVENTION

The present invention relates to methods and apparatus for optimizing the output and controllability of nonlinear harmonic generators that receive light at a primary frequency and emit light at a frequency that is a harmonic of the primary frequency.

BACKGROUND OF THE INVENTION

Bierlein U.S. Pat. No. 3.949.323 discloses the preparation of crystals, such as KTiO(PO$_4$) crystals (KIT crystals), that are useful as second harmonic generators (SHG).

Miyazuka et al. U.S. Pat. Nos. 4,953,931 and 4,953,943 describe nonlinear devices having a LiNbO$_3$ thin film waveguide layer formed on a LiTaO$_3$ substrate.

Tamada et al. U.S. Pat. No. 5,022,729 discloses a SHG having a Ta$_2$O$_3$TiO$_2$ system amorphous thin film optical waveguide on a substrate. The substrate may be a nonlinear optical crystal material. The waveguide can be made more effective by forming periodically poled regions of selected period and depth in the nonlinear substrate.

Yamamoto et al. U.S. Pat. No. 4,591,291 discloses a semiconductor laser and an optical nonlinear device positioned on a submount with the laser's active layer and the nonlinear device's surface waveguide facing the submount so that the fundamental light from the laser is directly applied to the nonlinear device and doubled in frequency producing a visible light Yamamota et al. U.S. Pat. No. 5,253,259 discloses a frequency doubler comprising a nonlinear crystal having domain inverted regions and a waveguide coupled to a semiconductor diode laser. The device includes a means for heating the frequency doubler to tune it to the desired frequency regardless of the ambient temperature.

Endo et al. U.S. Pat. No 5,546,220 discloses an optical structure that is clad with a metal coating to conduct electricity and uniformly heat an optical structure to tune it.

Welch U.S. Pat. No. 5,185,752 discloses a diode laser having a reflective back end coupled to a SHG. The SHG comprises a periodically poled waveguide having ferroelectric domains and a periodic reflector, particularly a distributed Bragg reflector (DBR) grating. This arrangement forms an optically resonant chamber feedback system that stabilizes the frequency output of the diode laser and efficiently couples the diode laser to the SHG.

By the techniques described above, and numerous others, significant improvement has been made in the efficiency, in terms of power output, currently being obtained from laser/SHG systems. Nevertheless, the efficiencies obtainable by the currently available devices are still very low. There is a need for achieving far greater efficiency, and so output power, because higher power laser/SHG units would be useful in a number of areas where current devices are unsatisfactory, such as optical data storage, remote sensing, and therapeutic medical applications. Practicing the present invention, using a KTP crystal optical structure, increases the output power from 2–5 times that from a similar KTP optical structure used in accordance with the prior art. Also the narrower wavelength of the output light from the devices of the present invention makes them more accurate in devices for detecting specific materials, avoiding false readings and making it unnecessary to have expensive devices to avoid false readings.

It has been observed that the second harmonic efficiency of nonlinear harmonic generator crystals of identical dimensions and apparent compositions often have different second harmonic generation efficiencies. It is also believed that various locations along the length of a single crystal may have different generation efficiencies. Also it has been observed that during second harmonic generation the generator tends to heat differentially along the length of the generator, with the greatest heating occurring in the zone near the output end of he generator. Additionally it has been observed that the internal conversion efficiencies of longer crystal generators tends to be less than for shorter length generators. The internal conversion efficiency, η in % is defined as:

$$\eta = \frac{P\beta\bar{\omega}\lambda}{[P\beta\gamma \times l]^2} \times 100$$

where PβγPβwγ are the power of the input fundamental and second harmonic beams respectively and l is the length of the waveguide.

The method of the present invention increases the internal conversion efficiency of nonlinear optical structures.

SUMMARY OF THE INVENTION

The present invention relates to a device that emits light comprising a nonlinear harmonic generator optical structure that receives light of a primary frequency at an input end thereof and emits at an output end thereof light of a second frequency that is a harmonic of the primary frequency, and at least two heat exchange means, each of which is adapted to exchange thermal energy between the heat exchange means and a separate section of the optical structure. Each heat exchange means is also independently controllable, so that more thermal energy is applied to sections near the input end than to sections near the output end of the optical structure.

The present invention also relates to the method of optimizing the harmonic frequency output of a nonlinear optical structure comprising introducing light of a primary frequency into an input end of the optical structure, which converts and emits from an output end of thereof light of a second frequency that is a harmonic of the primary frequency light; applying heat to the optical structure differentially alone its length at a plurality of separate locations, with more heat being added to sections near the input end than to sections near the output end of the optical structure; and controlling the application of heat at the separate locations as necessary to produce the desired optimized output light.

DEFINITIONS

Definitions of some terms, as used herein, are as follows:

"Light" means electromagnetic radiation of any wavelength. "Light" can be of constant intensity, modulating intensity, or pulsed.

"Primary frequency" means the frequency of the input fundamental light beam.

"Higher" harmonics frequencies means a numerical multiple of the fundamental frequency, as an example the second harmonic is double the frequency of the input fundamental light beam.

"Sections", when referring to the optical structure, mean separate, specific independent zones along the length of the optical structure. Sections have no borders, and to some extent separate sections may overlap. A section "near the input end" is readily distinguishable from a section "near the output end", although in a small optical structure these two sections might be adjacent to each other with no clear border between.

"Heat exchange" means the flow of thermal energy between two locations.

"Applying heat" and "applying thermal energy" mean transferring heat or thermal energy to some location. The terms "applying external energy (or heat) at a greater rate", "greater application of energy (or heat)", and "applying more energy (or heat)", when used in reference to energy transfer to or from the optical structure, are used to define net energy transfer. These terms include removing thermal energy as well as adding thermal energy, i.e. heating to add heat and cooling to remove heat from the optical structure. Thus the term "applying more thermal energy or heat near the input end than near the output end of the optical structure" includes the application of more energy, i.e. heat, to segments located near the input end than to segments located near the output end of the optical structure; it also includes removing less energy (i.e. cooling) from segments near the input end than from segments near the output end of the optical structure; and it also includes heating near the input end while cooling near the output end.

"Optimizing", as used in describing the desired output light includes not only includes maximizing the output power. It also includes producing the same output power while minimizing the required input power, i.e. using a smaller less expensive diode laser.

"Near the end of the optical structure" means near the end of that part of the overall optical structure that generates harmonics. For example, if the optical structure has a Bragg reflector along it's length at one end, the term "near the end of the optical structure". referring to the Bragg reflector end, means near that section of the optical structure that terminates where the Bragg reflector begins, since the Bragg reflector section does not generate harmonic light.

DETAILED DESCRIPTION OF THE PRESENT INVENTION

Figure 1:
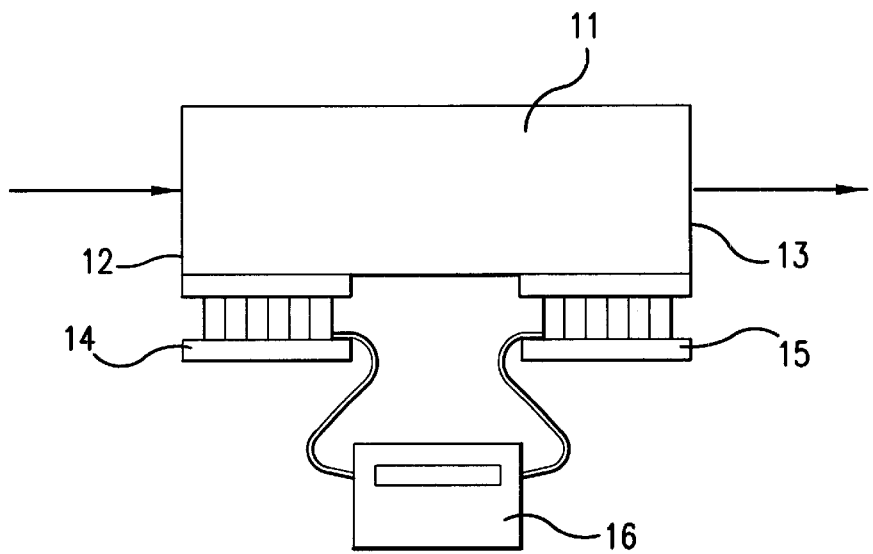
FIG. 1 is a schematic of a simple embodiment of the present invention device.

Referring to FIG. 1, a simple form of the preferred device of the present invention comprises a nonlinear harmonic generator optical structure 11, such as a bulk KTP crystal of the type disclosed n Bierlein U.S. Pat. No. 3,949,323, or KTP waveguide of a type disclosed in Bierlein U.S. Pat. No. 5,028,107. Optical structure 11 is callable of receiving an input light of a primary frequency into an input end 12 and converting part of the primary frequency light to output light to any harmonics of the primary frequency input light, along with unconverted primary frequency light The higher harmonic frequency light is emitted from the output end 13 of the optical structure. Two heat exchange means, heat exchangers 14 and 15, are positioned adjacent to and along the length of the optical structure 11, heat exchanger 14 to heat the section of the optical structure near input end 12 and heat exchanger 15 to heat the section of optical structure 11 near the output end 13. Heat exchangers 14 and 15 are independently controllable so that each can apply (or remove) heat at the appropriate rates to these two separate locations along the length of optical structure 11, more heat being applied near the input end 12 than near the output end 13 of optical structure 11. Heat exchange controller 16 regulates the heat applied by each heat exchanger 14 and 15. Heat exchange controller 16 monitors the temperatures at the interfaces between optical structure 11 and heat exchangers 14 and 15. The power output of optical structure 11 is monitored by separate instrumentation which is commercially available. Heat exchange controller 16 adjustable, in response to the power output, to apply the appropriate heat inputs to optical structure 11 by heat exchangers 14 and 15 to obtain maximum power output (efficiency) from optical structure 11. When using a bulk crystal optical structure, often it is desirable to also have heat transfer means that applies less thermal energy to the middle segment of the crystal than is applied to any other section because the middle segment tends to be heated more than the ends by the harmonic generation On the other hand, some devices that have a waveguide and Bragg reflector at the output end of the optical structure perform best with a heat transfer means located nearer the middle of the optical structure that applies the heat transfer means to the harmonic generating section of the waveguide and is otherwise operated in the manner of the present invention.

At maximum power output, heat exchanger 14 is applying more heat to optical structure 11 than heat exchanger 15. In an optical structure having substantial uniform birefringence index along its entire length, the difference in heat energy introduced by heat exchangers 14 and 15 will be substantially equal to the difference between the amount of heat generated near the input end 12 and the output end 13 of the optical structure 11 by the conversion of the input light to the higher harmonic frequency light in optical structure 11.

Figure 2:
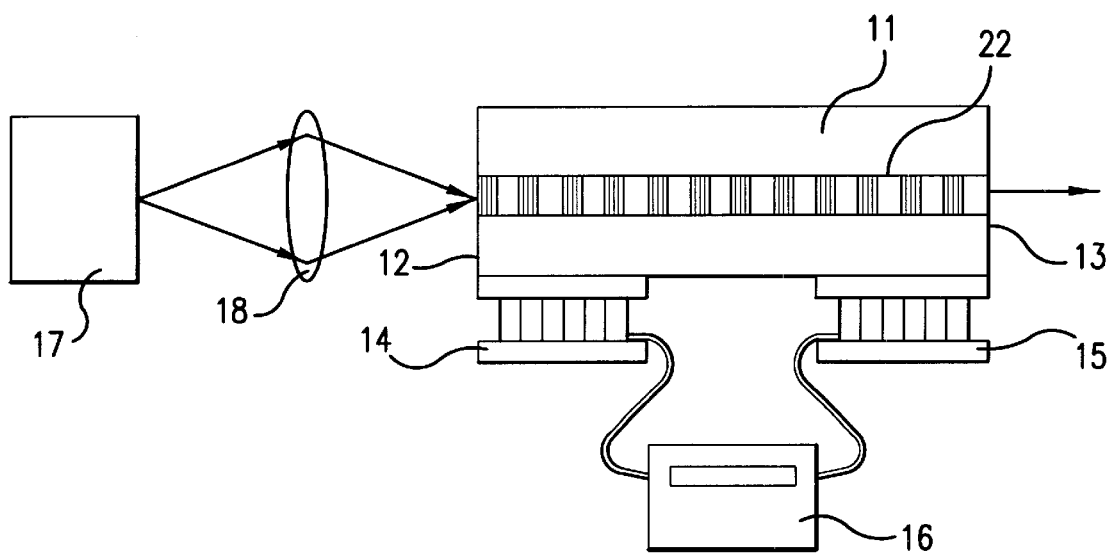
FIG. 2 is a schematic of a device of the present invention having a lens means for coupling the input light to the optical structure, wherein the optical structure is comprised of a waveguide.

Referring to FIG. 2, the device of FIG. 1 can be incorporated into apparatus having a laser 17 source of light optically coupled through a lens 18 to the input end 12 of optical structure 11.

Figure 3:
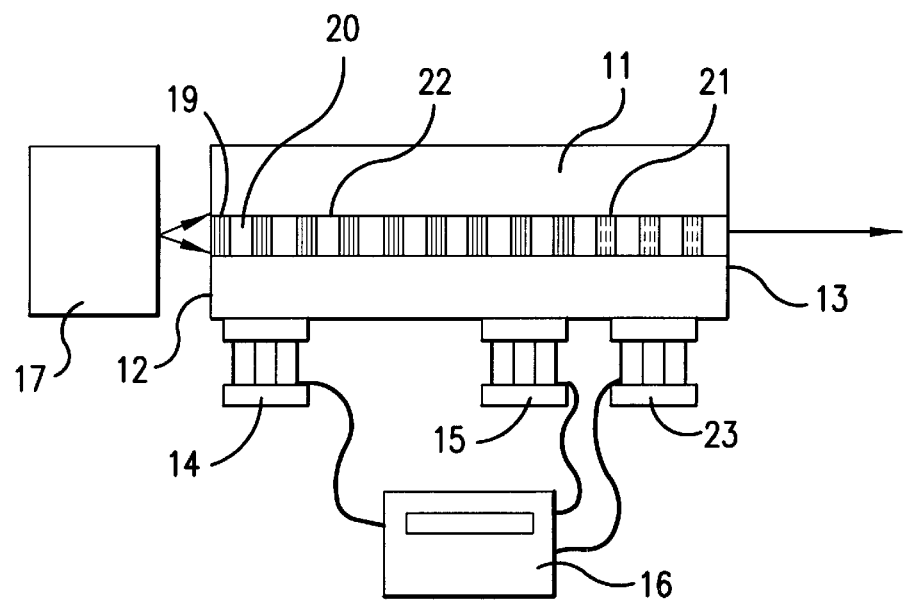
FIG. 3 is a schematic of a device of the present invention wherein the optical structure comprises a waveguide and a Bragg reflector.

Referring to FIG. 3, in another preferred device of the present invention, the optical structure 11 comprises waveguide 22 located in one surface of the optical structure 11. Waveguide 22 has alternately poled sections 19 and 20 positioned transverse to the direction of light flow, and Bragg reflector 21 at an end of waveguide 22. Heat exchangers 14 and 15 apply heat near the input and output ends, respectively, of optical structure 11. A separate independently controlled heat exchanger 23 applies heat to the Bragg reflector to independently tune it to obtain the desired output light frequency. Laser 17 supplies the input light Laser 17 is integrally coupled directly to the input end of optical structure 11. This preferred apparatus can be used in a laser light source for optical storage of computer data.

The optical structures used in the devices of the present invention can be any of the prior art optical devices, exemplified by those in the above mentioned patents. They are made by conventional techniques; many such optical structures are commercially available. Also a number of suitable bulk crystal optical structures, and optical structures with various types of waveguides and reflectors, are commercially available. The preferred optical structures are crystals of KTP, $LiNbO_3$, and $LiTaO_3$. As a generalization any nonlinear optical structure, preferably a ferroelectric crystal, that is suitable for use as a harmonic generator can be used in the devices of the present invention.

Any suitable heating and/or cooling heat exchange means can be used in the devices of the present invention. They must be capable of controllable heating and/or cooling the specific section of the optical structure. Normally a plurality, preferably two or three, separate independently controllable thermoelectric or resistive heat transfer elements are used.

A single heat transfer element can be used if it is capable of applying more heat near the input end than near the output end and the amount of heat applied to each end is independently controllable. However, it is difficult to design such a unit to give optimum differential heat transfer over the length of the optical structure, particularly to the areas near the two ends. Also, since the optical characteristics along the length of the optical structure are seldom uniform, and change over the use life of the optical structure, the required heat inputs near the ends of the structure may vary from one optical structure to another and with time of use, which are difficult to accomplish with a single heat exchange unit Thus for acceptable controllability of the functioning of the optical structure, in practice a plurality of independently controllable external heat exchange means are employed in the devices of the present invention.

Desirable independently controlled heat exchange means are positioned near the input end and near the output ends of the optical structure. One or more additional heat exchange units may be positioned between the two end units, nearer the middle along the length of the optical structure. A heat exchange unit adjacent to the middle of the optical structure is particularly desirable when using a bulk crystal optical structure because the optical focal point of the bulk crystal is near the middle of the length of the bulk crystal. In devices that have a Bragg reflector, it may be desirable to have a separately controlled heat exchange means that can exchange thermal energy with the Bragg reflector, thereby heating or cooling it as necessary to obtain the desired frequency.

The preferred heat exchange units are thermoelectric devices that can effect thermal energy flow in and out of die optical structures. Preferably these are affixed onto the face of the optical structure that is nearest to the light path through the optical structure. Thus if the optical structure has a waveguide adjacent to one surface of the optical structure, the preferred positioning of the heat exchangers is adjacent to the waveguide surface.

To control the differential heat transfer along the length of the optical structure by the heat exchange units, any control means can be used that is capable of reaction to the temperatures at the areas of heat transfer and that is capable of independently modifying the heat transfer by each heat exchange unit in response to an automatic or operator's command. If the optical structure is to be tuned to produce the desired output frequency, either the heater controller or some other means must be capable of modifying the overall temperature of the optical structure. The most useful, and so the most preferred range of input light wavelengths is from about 400 nm to 10,000 nm.

Absolute maximum efficiency of the devices of the present invention require nonlinear and changeable heating along the length of the optical structure because the harmonic generation process is nonlinear which results in a nonlinearly increasing amount to absorbed energy from the harmonic toward the output end of the optical structure. In addition, manufactured irregularities in properties of the optical structure, irregularities between apparently similar crystals, irregularities introduced by etching, and by use chances also result in not linear conditions. Consequently no specific predetermined setting for the applications of heat transfer will be the optimum efficiency settings between energy inputs at the various locations along the length of the optical structure. Consequently the optimum heat transfer settings are not completely predictable, and must be optimized by trial that is well within the skill of an operator or automated controller, using the output power as the reference, and are likely to require resetting as aging changes are induced in die optical structure due to use.

The practice of the invention will become further apparent from the following non-limiting Examples.

EXAMPLE 1

Figure 4A:
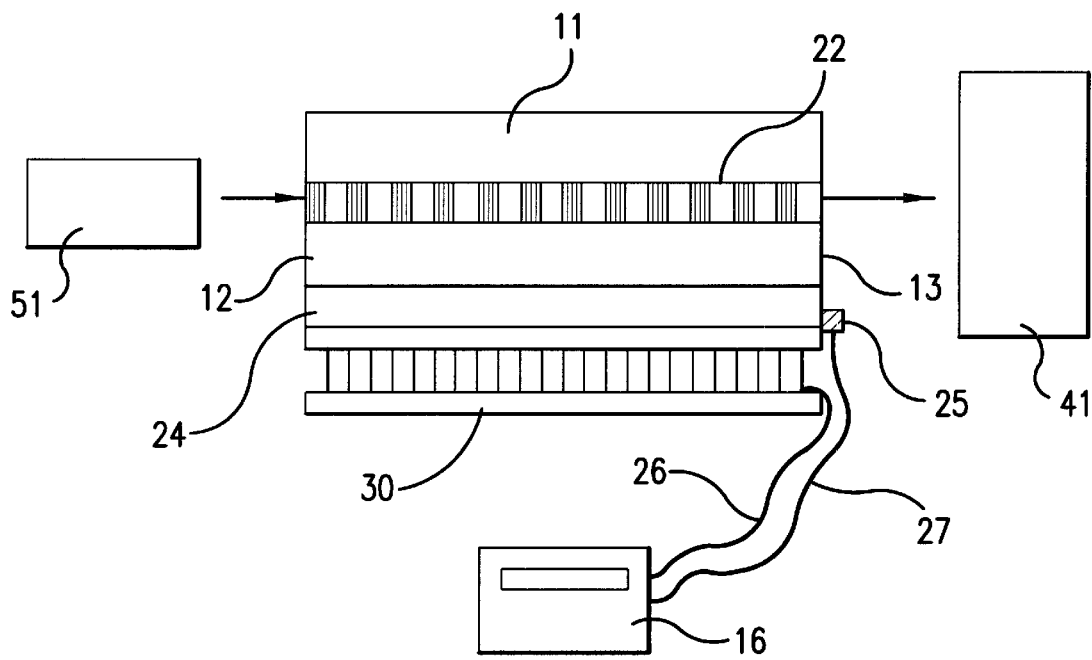
FIG. 4a is a prior art device having uniform heat transfer along the length of the optical structure.

This Example compares a standard prior art second harmonic generator device with a present invention temperature controlled harmonic generator device. The Example is carried out at room temperature of 21° C. Referring to FIG. 4a, the prior art device has a nonlinear KTP waveguide harmonic generator optical structure 11, which is 6.77 mm in length, 2.35 mm in width, and 0.77 mm in thickness. Optical structure 11 has a periodic waveguide 22, and is thermally controlled by a "Peltier" thermoelectric cooler (TEC) 30 (MELCOR FC 0.7-18-05L), which is affixed with cyanoacrylate (super glue) to a thin aluminum plate 18, 10.0 mm long, 6.0 mm wide and 0.8 mm thick Optical structure 11 is placed (not glued) on top of aluminum plate 18 which contains a thermister 25 to determine the temperature of the aluminum plate 18. TEC 30 is set to be 21° C. throughout its length. The input light directed to optical structure 11, is supplied by a titanium sapphire laser that scans a predetermined range of wavelengths from 849 nm to 854 nm with a power input of 48 mW.

The device is activated and after it has reached stable conditions, the output light is analyzed by a United Detector Technology power meter model 390 (UDT 390) calibrated in accordance with standards set forth by the National Institute of Standards and Technology (NIST) and a Burleigh wavemeter model WA-2000. FIG. 4c is a graph of the output light power at the emitted wavelengths, the dotted line representing the output from the FIG. 4a prior art device. This output light has its major peak at 425.76 nm wavelength, the second harmonic of the major segment of the input light to the optical structure 11, at a power output of 0.543 mW. The width of the major power peak spans about 0.181 nm wavelengths. A lesser peak at 426.09 nm is also emitted, possibly caused by process induced fluctuations in the design period length of the waveguide.

Figure 4B:
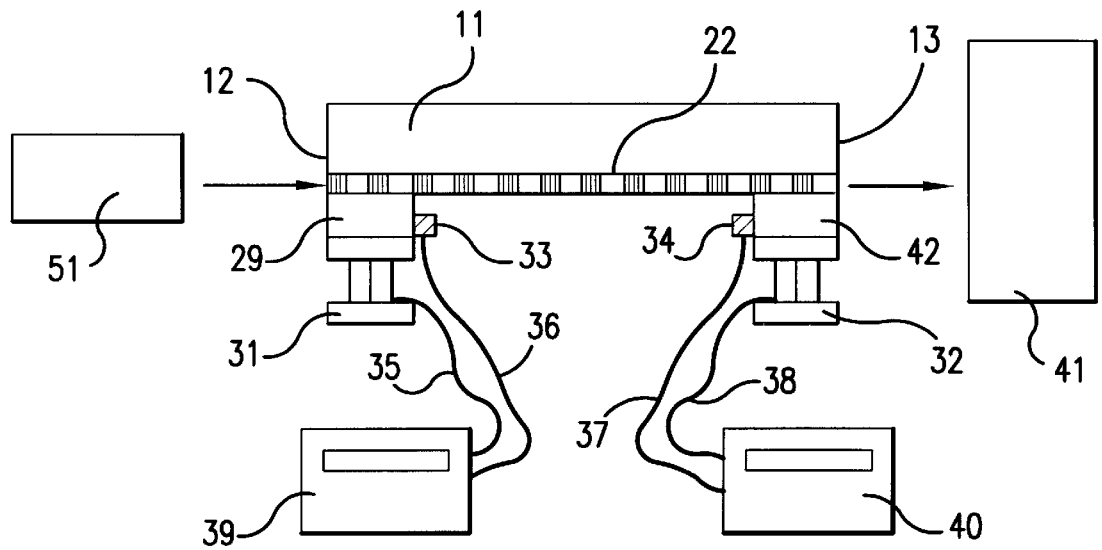
FIG. 4b is a present invention device having heat exchange means near the input end and near the output end of the optical structure, wherein the optical structure is comprised of a waveguide, along, with heat exchange controllers.
Figure 4C:
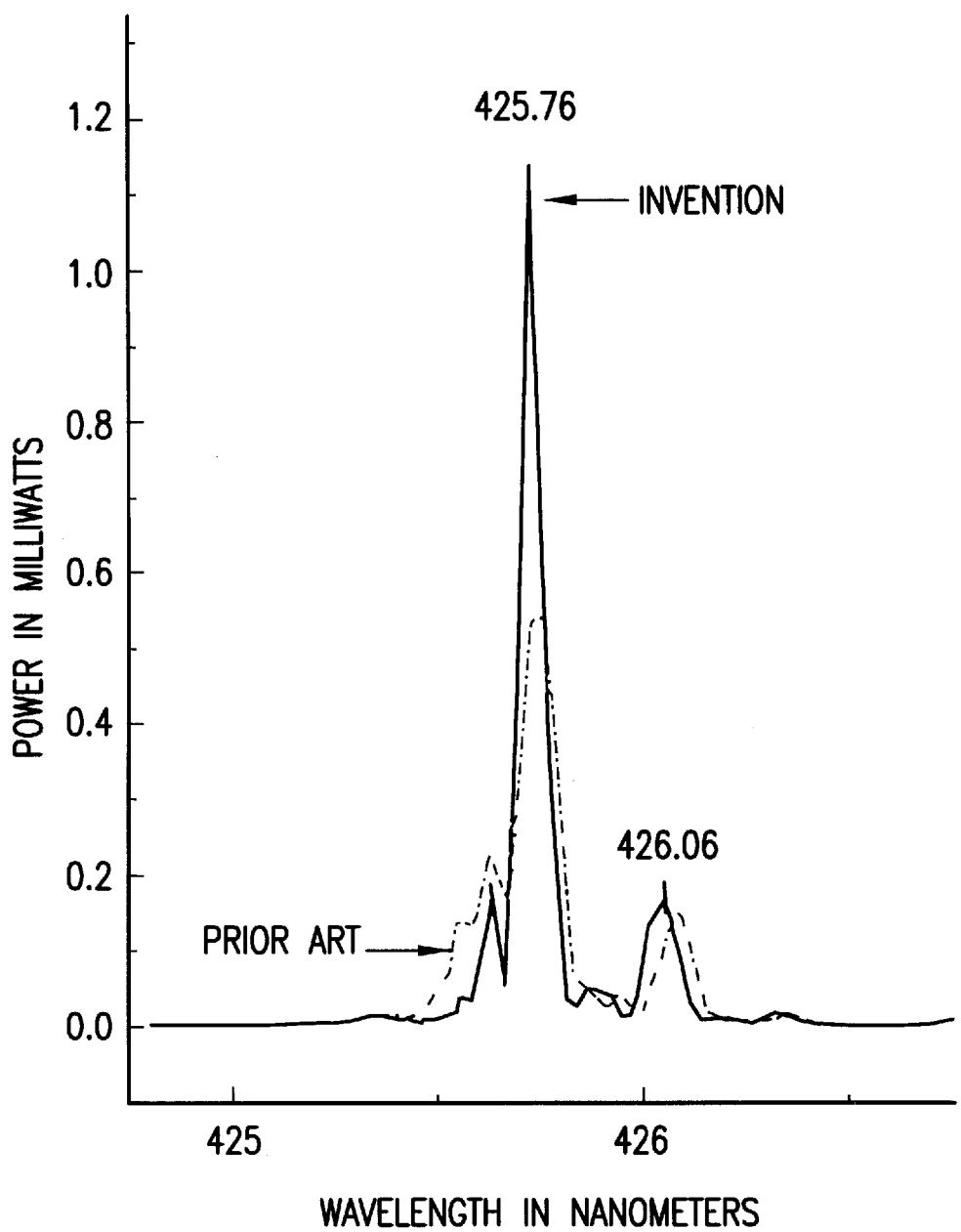
FIG. 4c is a graph of the output light power over a frequency range for the devices of FIGS. 4a and 4b.

FIG. 4b is a harmonic generator optical device of the present invention having two heat exchange means to independently control the flow of thermal energy to two separate sections of optical structure 11. The optical structure is the same KTP optical structure as in the above described prior art device. It is placed on top of the aluminum plate 18, which is affixed with cyanoacylate to two Melcor model FC 0.45-31-1 thermoelectric coolers (TECs) 31 and 32 positioned under tie input end 12 and output end 13 of optical structure 11, respectively. Two temperature sensors 33 and 34 YSI model #44016 thermisters are affixed inside the aluminum plate with "Lucite" delta bond thermally conductive adhesive (part No. 156) under input end 12 and output end 13 of optical structure 11. TECs 31 and 32 and temperature sensors 33 and 34 are connected by wires 35 and 36, and 37 and 38 respectively, to two independent ILX DT model 5910 manually adjustable temperature controllers 39 and 40 that show the temperatures at the end interfaces of aluminum plate 18 with optical structure 11.

After assembling this device, input light identical to the light applied to the above described prior art device is applied to the input end 12 of optical structure 11. After stable operation is achieved, the output light is analyzed via the UDT 390 and the Burleigh wavemeter model WA-2000 to determine the wavelength of the major output peak. TECs 31 and 32 are adjusted to heat or cool the two ends of optical structure 11 as necessary to tune output light to the maximum output power, as measured by the UDT 390 power meter. In this final adjustment, the temperatures at temperature sensor 33 is 25.4° C., and 16.6° C. at temperature sensor 34.

Referring to the solid line of FIG. 4c, the output light generated using the new invention as described in FIG. 4b has its major power peak at 425.76 nm and an output power of 1.12 mW. The width of the major power peak spans only about 0.09 nm wavelengths. Output light from output face 12 from this device also has the lesser peak at 426.06 nm.

Thus, it is seen that the second harmonic power generation by the present invention device of FIG. 4b is more than double that of the prior art device of FIG. 4a Furthermore, the major output peak is much more narrowly focused, the frequency width of the major output peak at its base of the present invention device being only about 50d as wide as the output peak of the prior art device.

EXAMPLE 2

Figure 5A:
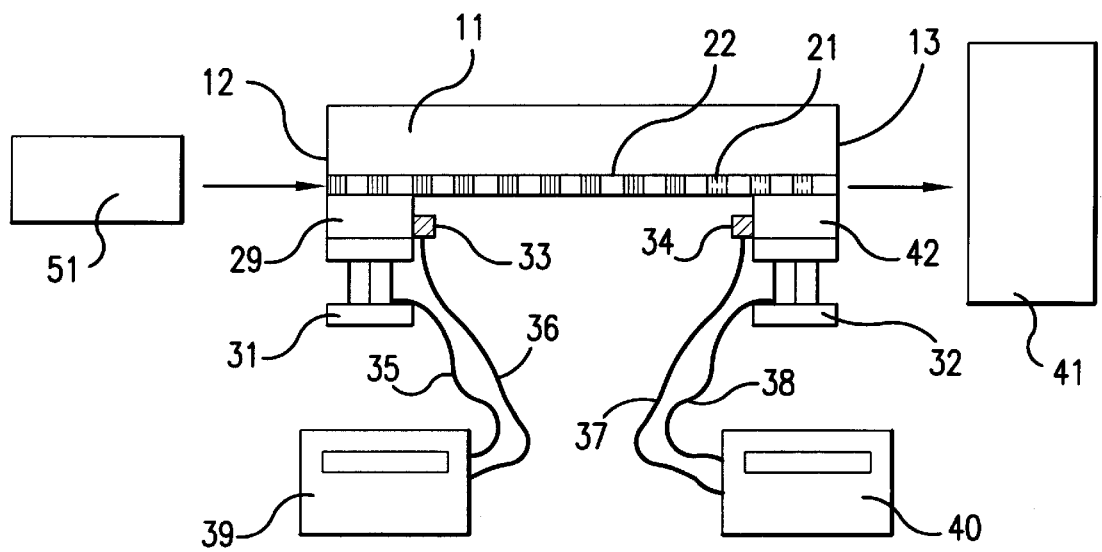
FIG. 5a is a device of the present invention having heat exchange means near the input and output ends of the optical structure, wherein the optical structure comprises a waveguide and Bragg reflector.

Example 2 repeats the procedure of Example 1 using the prior art device (FIG. 4a) and the present invention device (FIG. 4b), except that the optical structure also comprises a Bragg reflector. This form is shown in FIG. 5a. To optical structure is 11.5×1.8× 0.8 mm with a second harmonic section of 8.7 mm long and a Bragg section 2.8 mm long. This optical structure is cooled by the same TEC 30 used in Example 1 which is affixed with the same glue to the same thin aluminum plate as in Example 1. As is the case in Example 1, the optical structure is placed (not glued) on top of the aluminum plate 10×6×0.8 mm. TEC is set at 21° C. throughout its length. The input light, directed to optical structure 11, is supplied by a titanium sapphire laser that scans a predetermined range of wavelengths from 840.5 nm to 846.1 nm with a power input of 96 mW.

Figure 5B:
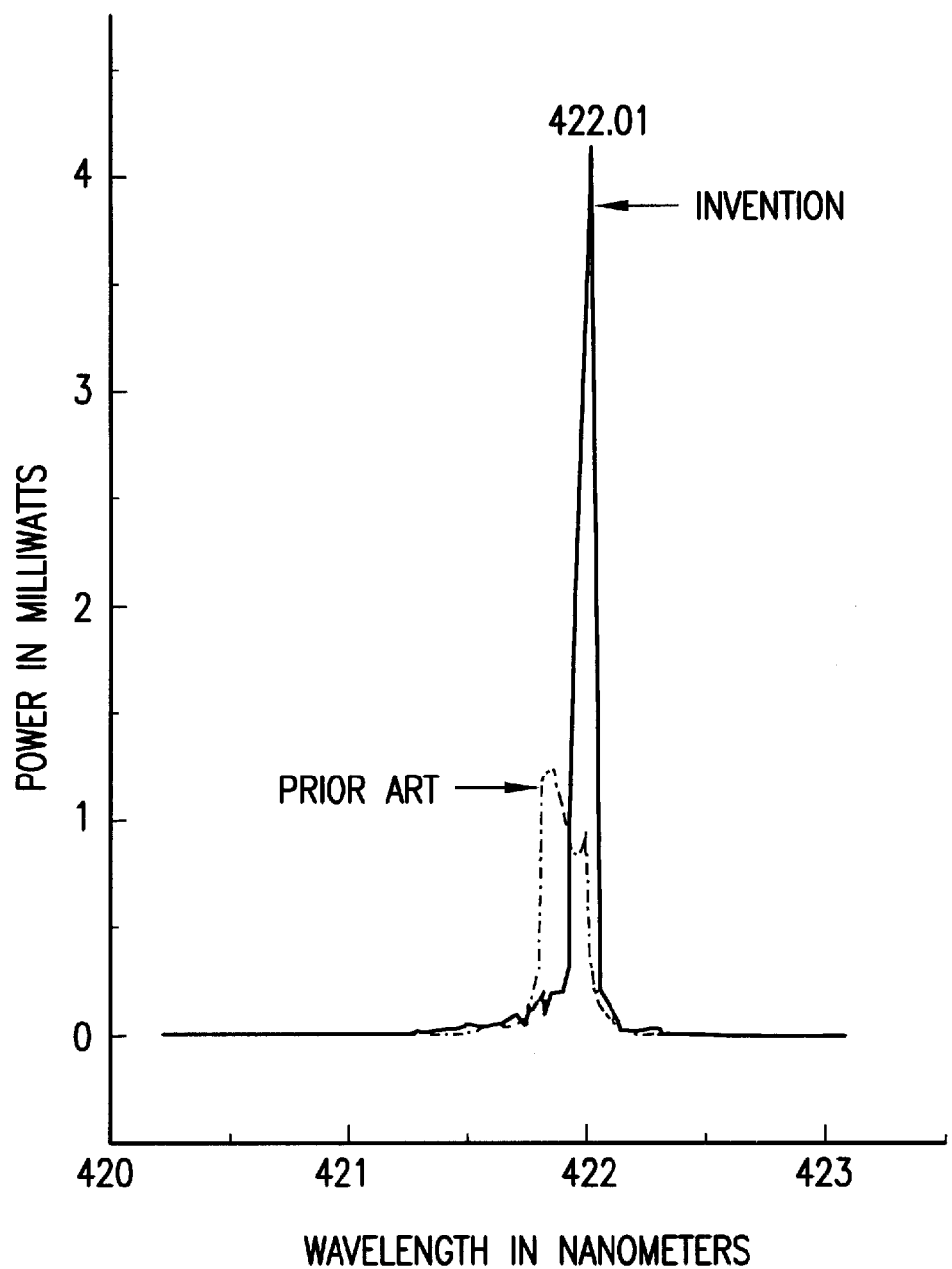
FIG. 5b is a graph of the output light power over a frequency range for the device of FIGS. 4a and 5a wherein both optical structures are comprised of a waveguide and Bragg reflector.

FIG. 5b shows the power of the generated output light from the modified device having the Brag reflector optical structure as a function of the wavelength of the input fundamental light beam. The dotted line represents the output from the prior art device and the solid line that of the modified device.

Using prior art, the output light has its major peak at 421.86 nm and the second harmonic output power is measured to be 1.25 mW. The peak spans about 0.450 nm. Using the invention, we obtain a major peak of the second harmonic at 422.01 nm, the second harmonic power is 4.06 mW with an input fundamental power of 96 mW. The width of the major peak spans 0.102 nm. In this final adjustment, the temperatures at temperature sensor 33 is 28.5° C., and 14.3° C. at temperature sensor 34.

Thus it is seen that the second harmonic power generation by this present invention device is 325% higher of the power from the prior art. Furthermore, the major peak output peak is much more narrowly focused, the full bandwidth at half the maximum output power of the major peak output peak of the present invention device is about 23% as wide as the output peak of the prior art device.

EXAMPLE 3

The procedure of Example 1 is followed using the present invention devices illustrated in FIGS. 6, 7, 8, and 9. Comparative tests we run on one hand with heat exchange using one TEC activated at the same temperature in accordance with prior art practice and on the other hand with two TECs activated at two different temperatures as to maximize the output power of the second harmonic light (more heat being applied near the input end than near the output end of the optical structure).

Figure 6:
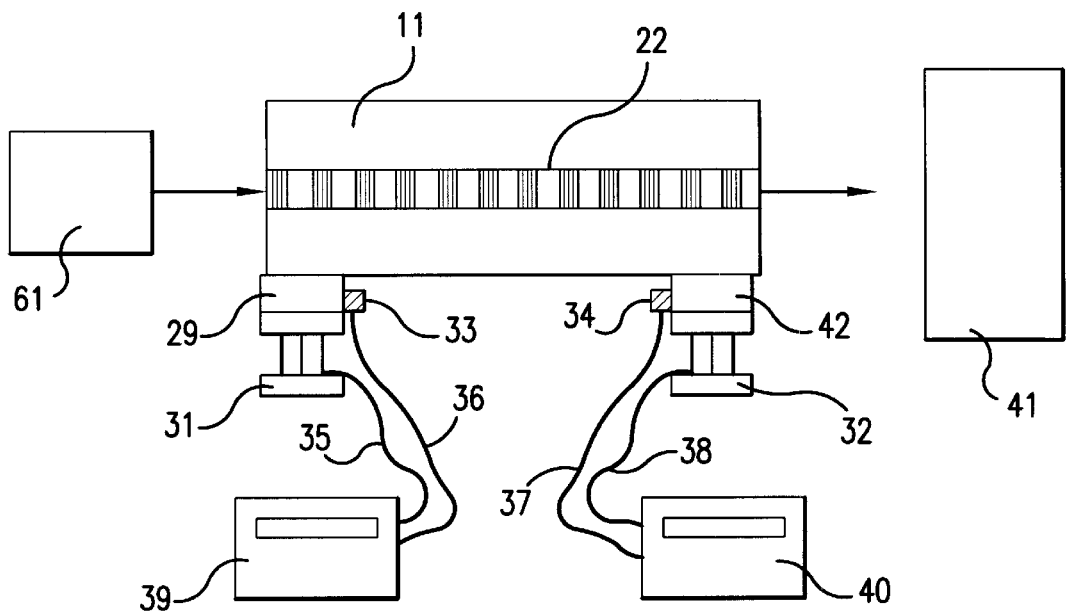
FIG. 6 is an alternate form of the present invention device wherein a Bragg reflector is located in the diode laser.

Using the device of FIG. 6, input light is generated by a Spectra Diode Laboratory series 5700 (DBR) diode laser 61. Diode 61 has an internal grating for laser locking. The input light is fed into optical device 11, which is the same as the optical structure of Example 1. Adjacent to optical structure 11 are two TECs, heat exchange means 31 adjacent to the input end and heat exchange means 32 adjacent to the output end.

Significantly greater power output is obtained when operating the device of FIG. 6 in accordance with the present invention with more heat being applied to the optical structure near the input end than near the output end, as compared to operating with no heat transfer from the TECs in accordance with prior at practice.

Figure 7:
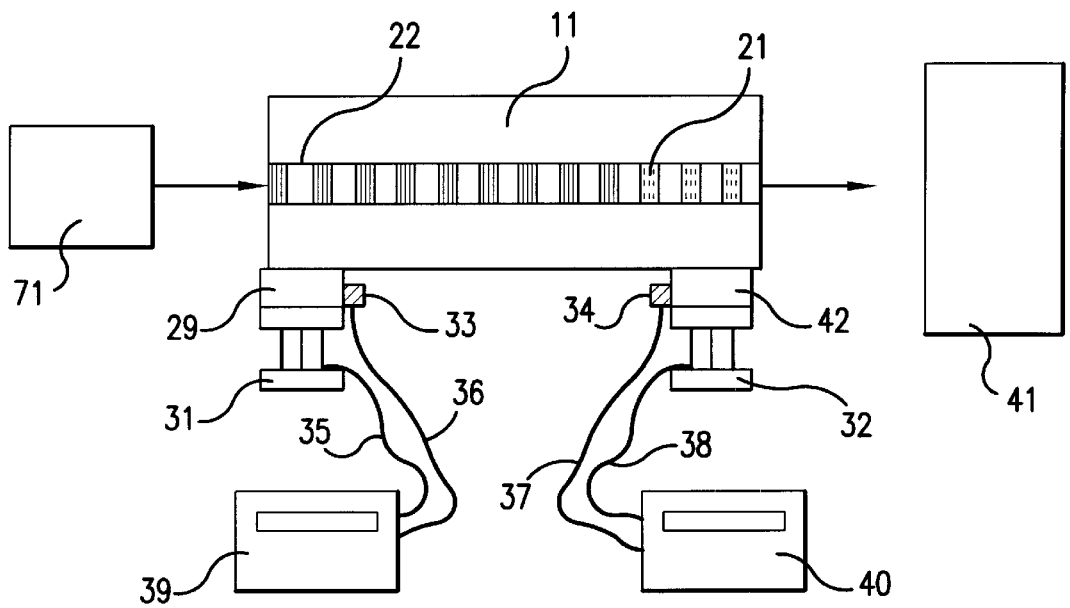
FIG. 7 is an alternate form of the present invention device wherein a Bragg reflector is located in the optical structure, and the optical structure is optically coupled to a diode laser.

Using the device of FIG. 7, input light is generated by a Spectra Diode Laboratory standard 5400 diode laser 71. Optical structure 11 is the same as that of Example 1 except for an internal diffraction grating 21. This grating passes some of the second harmonic light and reflects some of the fundamental input light back to the diode laser for frequency locking. Adjacent to optical structure 11 are two TECs, heat exchange means 31 adjacent to the input end and heat exchange means 32 adjacent to the output end.

Significantly greater power output is obtained when operating the device of FIG. 7 in accordance with the present invention with more heat being applied to the optical structure near the input end than near the output end, as compared to operating with no differential heat transfer from the TECs in accordance with prior art practice.

Figure 8:
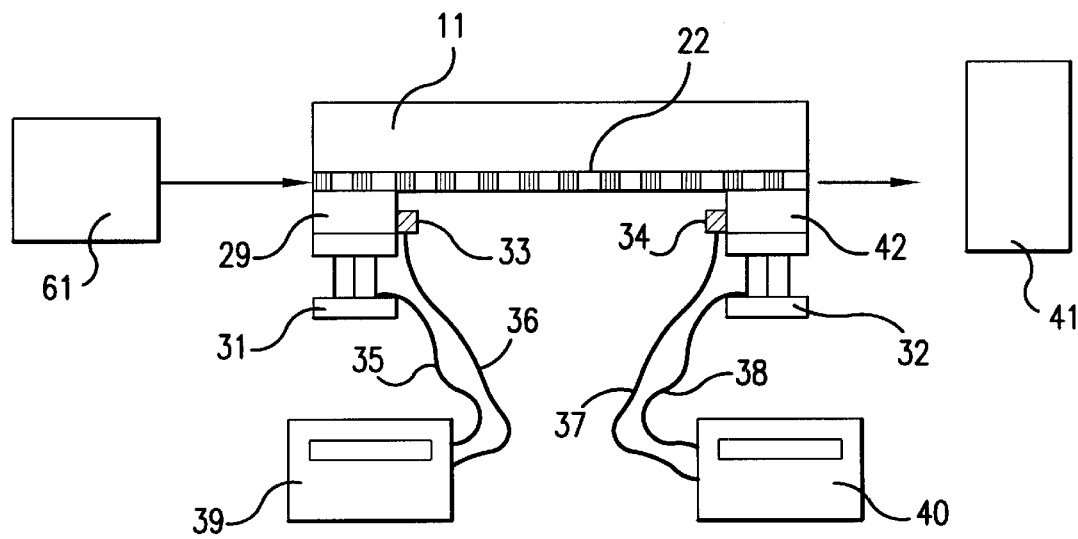
FIG. 8 is an alternate form of the present invention device having an optical structure that has a waveguide containing surface of the optical structure positioned adjacent to the heat exchanges means.

Referring to the device of FIG. 8, input light is generated by Spectra Diode Laboratory standard T-03 model 5400 diode laser 61. Optical structure 11 is the same as that of Example 1; however, it is mounted with the waveguide containing surface of the optical structure down adjacent to the TEC heat exchange means 31 at its input end and TEC heat exchange means 32 at its output end.

Significantly greater power output is obtained when operating the device of FIG. 8 in accordance with the present invention with more heat being applied to the optical structure near the input end than near the output end, as compared to operating with no heat transfer from the TECs in accordance with prior art practice.

Figure 9:
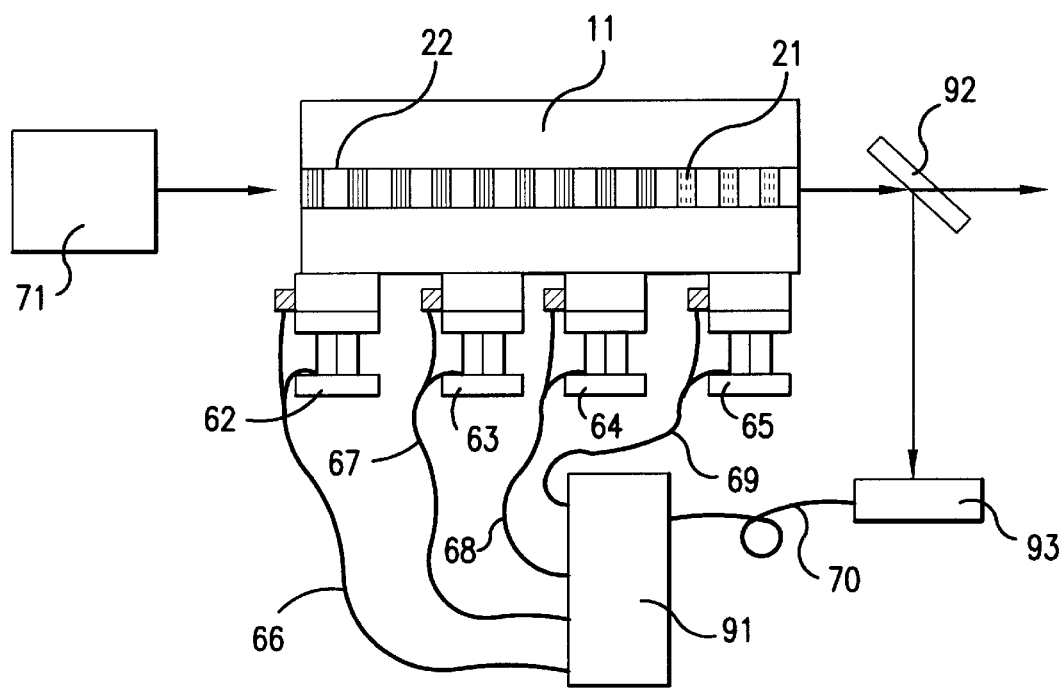
FIG. 9 is an alternate form of the present invention device having a controller for the energy exchange means that is optically coupled to the output light

Referring to the device of FIG. 9, input light is generated by Spectra Diode Laboratory standard T-03 model 5400 series diode laser 71. Optical structure 11 is the same as that of FIG. 7. Four heat exchange TECs are located adjacent to the optical structure, TEC heat exchange means 62 at the input end, TEC 65 at the output end, and TECs 63 and 64 intermediate thereof Control box 91 is electrically connected to each of the four TECs and dictates the amount of heat each TEC applies to the four regions adjacent to the individual TECs. Control box 91 monitors the output light via dichroic 92 and photo electric detector 93 to the output light. The controller thereby monitors the output light power, and in response thereto modifies the energy transfer being affected by the TECs to produce the maximum output light power.

EXAMPLE 4

Figure 10A:
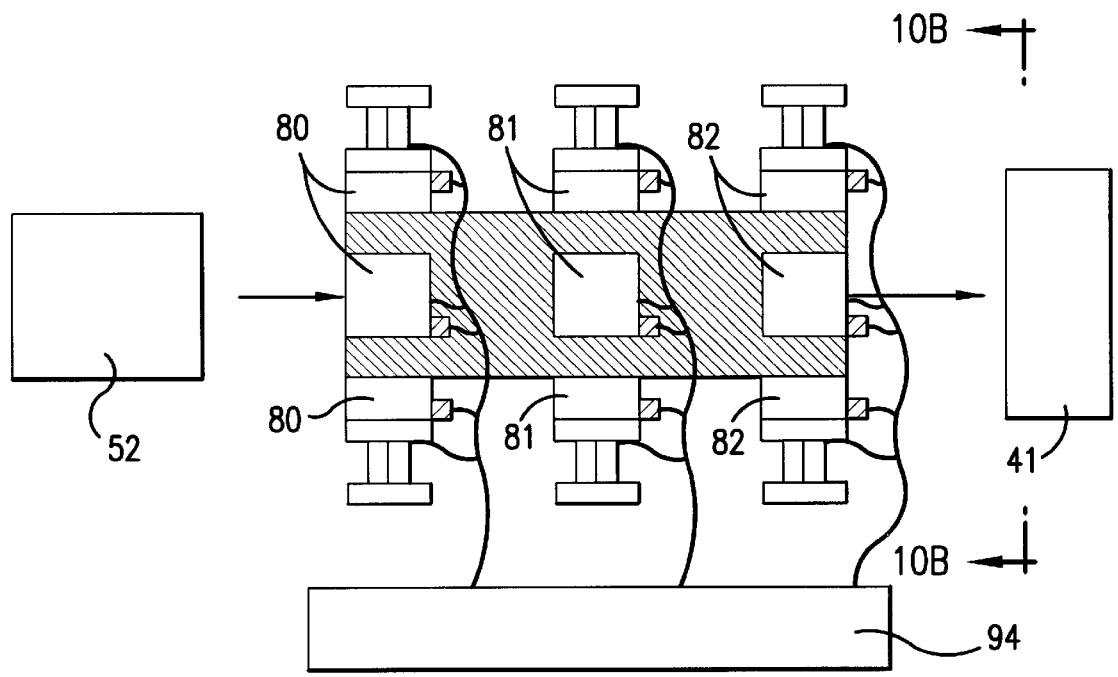
FIGS. 10a is an alternate form of the present invention device having an optical structure, wherein the optical structure is a bulk crystal.
Figure 10B:
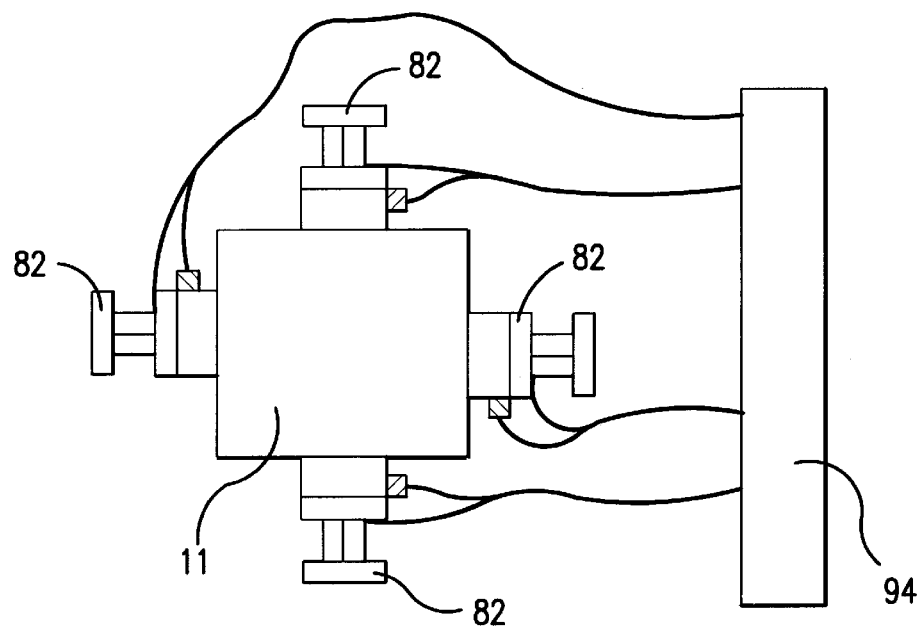
FIG. 10b is a cross section of FIG. 10a along line A—A.

The prior art and present invention devices of Example 1 are modified by replacing the optical structure (having a waveguide) of Example 1 with a bulk crystal not having a waveguide. As is shown in FIGS. 10a and 10b, a bulk KTP crystal, optical structure 11, of dimensions 5×5×10 mm cut for doubling at 1064 nm obtainable from commercial supplier, is used. In the prior art, the bulk KTP crystal is uniformly heated, while the device of the present invention has a series of twelve TEC heat exchangers (MELCOR FC 0.45-11-05 L-1) located symmetrically around the crystal as shown in FIGS. 10a (side view) and 10b (end view A—A). Each subassembly, 80, 81, and 82, consisting of a TEC, a thermister, an aluminum block and a wire set containing four wires, is wired separately from the other as indicated in FIGS. 10. All wires are connected to a control box, 94. The input light, directed to optical structure 11, is supplied by aNd:YAG laser operating at 1064 nm, said laser 52. The second harmonic output light generated from this device is analyzed using die UDT 390 power meter, 41, and a Burleigh wavemeter, both described in Example 1. The power of the second harmonic output is optimized by carefully adjusting the temperatures along the crystal using the TEC coolers in place as necessary. This is achieved by applying the highest and lowest temperatures at the input and output ends of the crystal respectively. Care must be taken to set the crystal at the correct phase-matching angle.

Particular embodiments of the invention are included in the examples. Other embodiments will become apparent to those skilled in the art from a consideration of the specification or practice of the invention disclosed herein. It is understood that modifications and variations may be practiced without departing from the spirit and scope of the novel concept of this invention. It is further understood that the invention is not confined to the particular modifications and examples herein illustrated, but it embraces such modified forms thereof as come within the scope of the claims.

What is claimed:

1. A device that emits light comprising a nonlinear harmonic generator optical structure that receives light of a primary frequency at an input end thereof and emits at an output end thereof light of a second frequency that is any harmonic of said primary frequency, and at least two heat exchange means each of which (a) is adapted to exchange thermal energy between a section of said structure and each said heat exchange means, and (b) is independently controllable to apply more thermal energy to a section near the input end than to a section near the output end of said structure.

2. The device of claim I wherein said heat exchange means are structured to apply more heat near the input end than to any other location along the length of said optical structure.

3. The device of claim 1 wherein said optical structure comprises a bulk crystal suitable for nonlinear harmonic generation.

4. The device of claim 1 wherein said optical structure is a ferroelectric nonlinear harmonic generator.

5. The device of claim 1 wherein said optical structure comprises an optical waveguide.

6. The device of claim 1 wherein said optical structure comprises an optical waveguide and a reflector.

7. The device of claim 1 wherein said optical structure comprises an optical waveguide and a Bragg reflector.

8. The device of claim 1 wherein said optical structure comprises an optical waveguide, a Bragg reflector and independently controllable heat exchange means adapted to apply energy to said Bragg reflector.

9. The device of claim 1 comprising a diode laser integrally coupled to said optical structure.

10. The device of claim 1 comprising a diode laser coupled to said optical structure by an optical lens structure.

11. The method of optimizing the harmonic frequency output of a nonlinear optical structure comprising.

a) introducing light of a primary frequency into an input end of said structure, which structure converts part of said light to a second frequency that is a harmonic of said primary frequency and emits said light of a second frequency at an output end of said structure;

b) applying heat to said optical structure differentially along the length of said structure at a plurality of sections along the length of said structure, with more heat being added near the input end than near the output end of said structure; and controlling said applying of heat as necessary to maximize the output power of said light of a second frequency.

12. The method of claim 11 wherein said applying of heat is independently controllable at more than one of said sections.

13. The method of claim 11 wherein during said controlling, temperatures are measured at more than one of said sections.

14. The method of claim 11 wherein said applying heat is effected at least at sections near the input end and the output ends of said optical structure.

15. The method of claim 11 wherein said light is from a diode laser.

16. The method of claim 11 wherein said light is introduced from a laser diode integrally coupled to said optical structure.

17. The method of claim 11 wherein said light is introduced from a laser diode coupled to said optical structure through an optical lens device.

18. The method of claim 11 wherein said input light is passed through a waveguide in said optical structure.

19. The method of claim 11 wherein a part of the light passing through said optical structure is reflected toward the source of input light.

* * * * *